United States Patent [19]
Wagner

[11] 3,996,519
[45] Dec. 7, 1976

[54] DIGITAL SIGNAL PROCESSOR

[75] Inventor: Peter B. Wagner, Reno, Nev.

[73] Assignee: The United States of America as represented by the Secretary of the Navy, Washington, D.C.

[22] Filed: July 2, 1975

[21] Appl. No.: 592,851

[52] U.S. Cl. .............................. 325/142; 340/353
[51] Int. Cl.² ......................................... G01R 7/00
[58] Field of Search .......... 325/142, 321; 340/353, 340/206; 178/82 A, 112, 66, 67, 68; 332/1, 11

[56] References Cited
UNITED STATES PATENTS
3,510,780   5/1970   Buehrle .............................. 178/68

OTHER PUBLICATIONS
Rosen, "IBM Technical Disclosure Bulletin" vol. 16, No. 8, Jan. 1974, pp. 2744–2745.

Sheingold, "Analog–Digital Conversion Handbook" 1972, pp. I-31 to I-37.

Primary Examiner—Charles D. Miller
Attorney, Agent, or Firm—R. S. Sciascia; Charles D. B. Curry

[57] ABSTRACT

A digital signal processor that is particularly suitable for converting an analog input signal into a stored digital signal for serial transmission in short and long time duration signals which will be indicative of the analog input signal. The system employs a digital gain control to maintain nearly uniform transmission signal levels, two parity generators to assure proper signal transmission, and a set-reset flip-flop shift register and logic system for controlling the output of the serially connected shift register containing the information to be serially transmitted.

7 Claims, 5 Drawing Figures

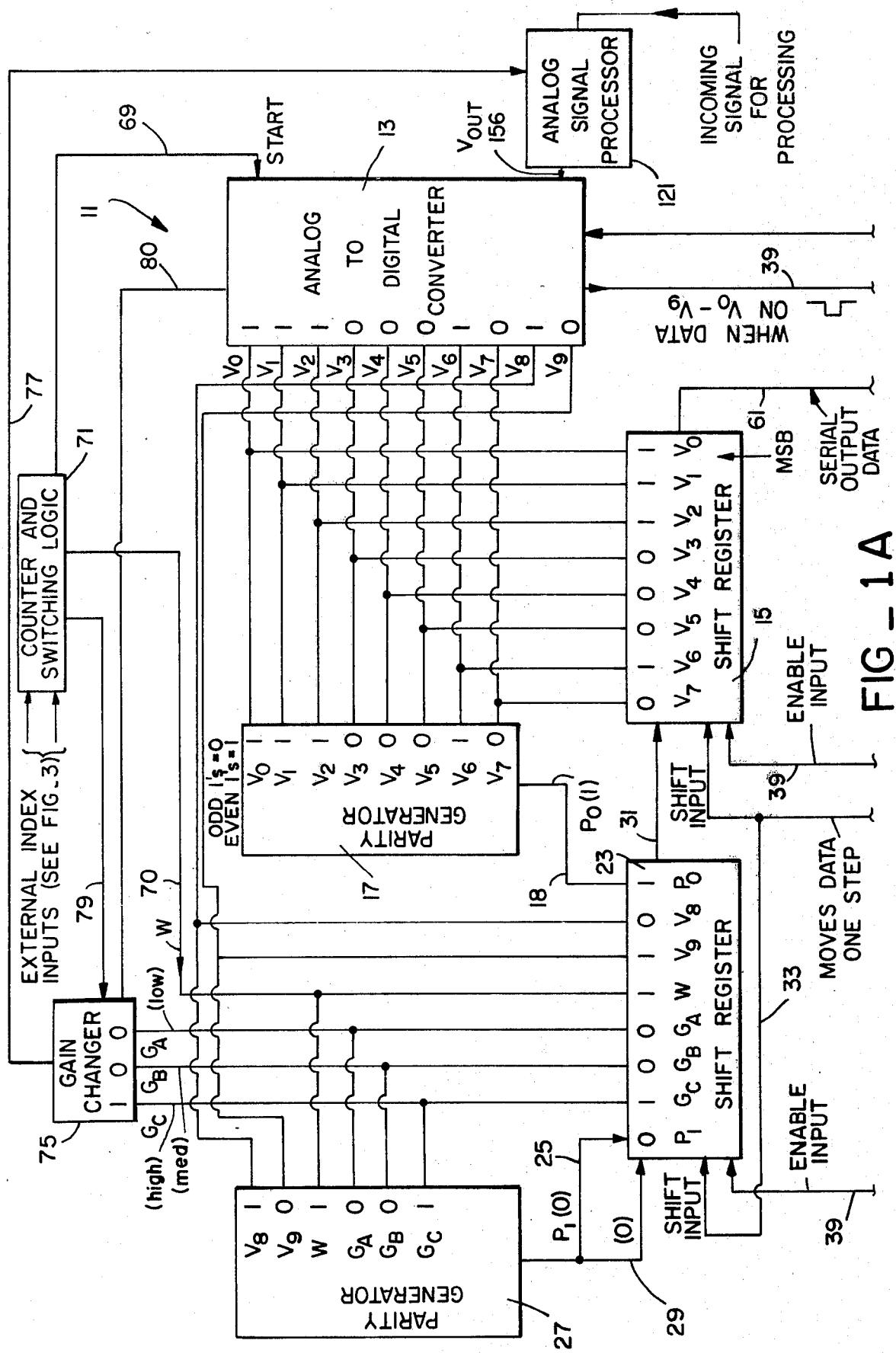
FIG_1A

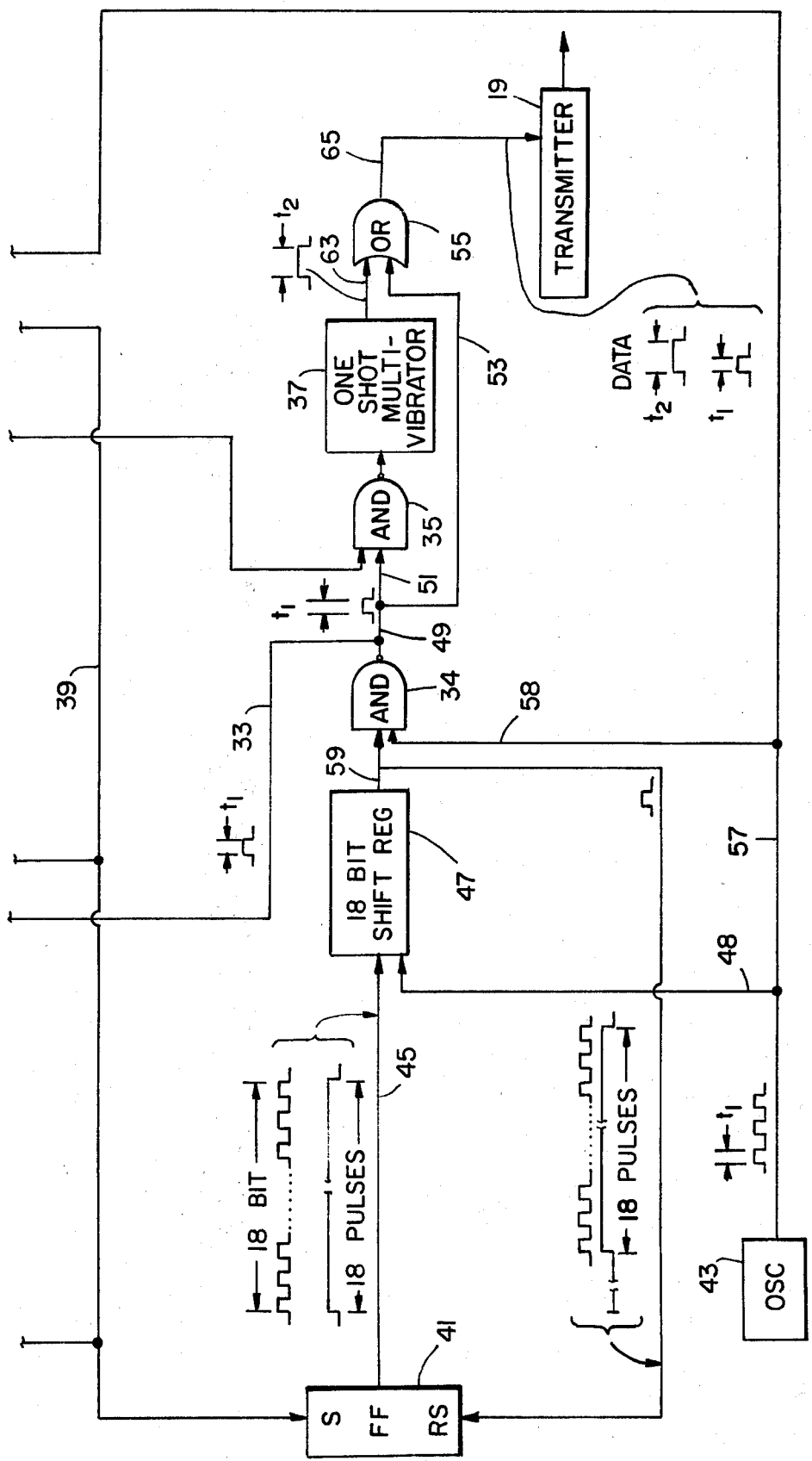
FIG_1B

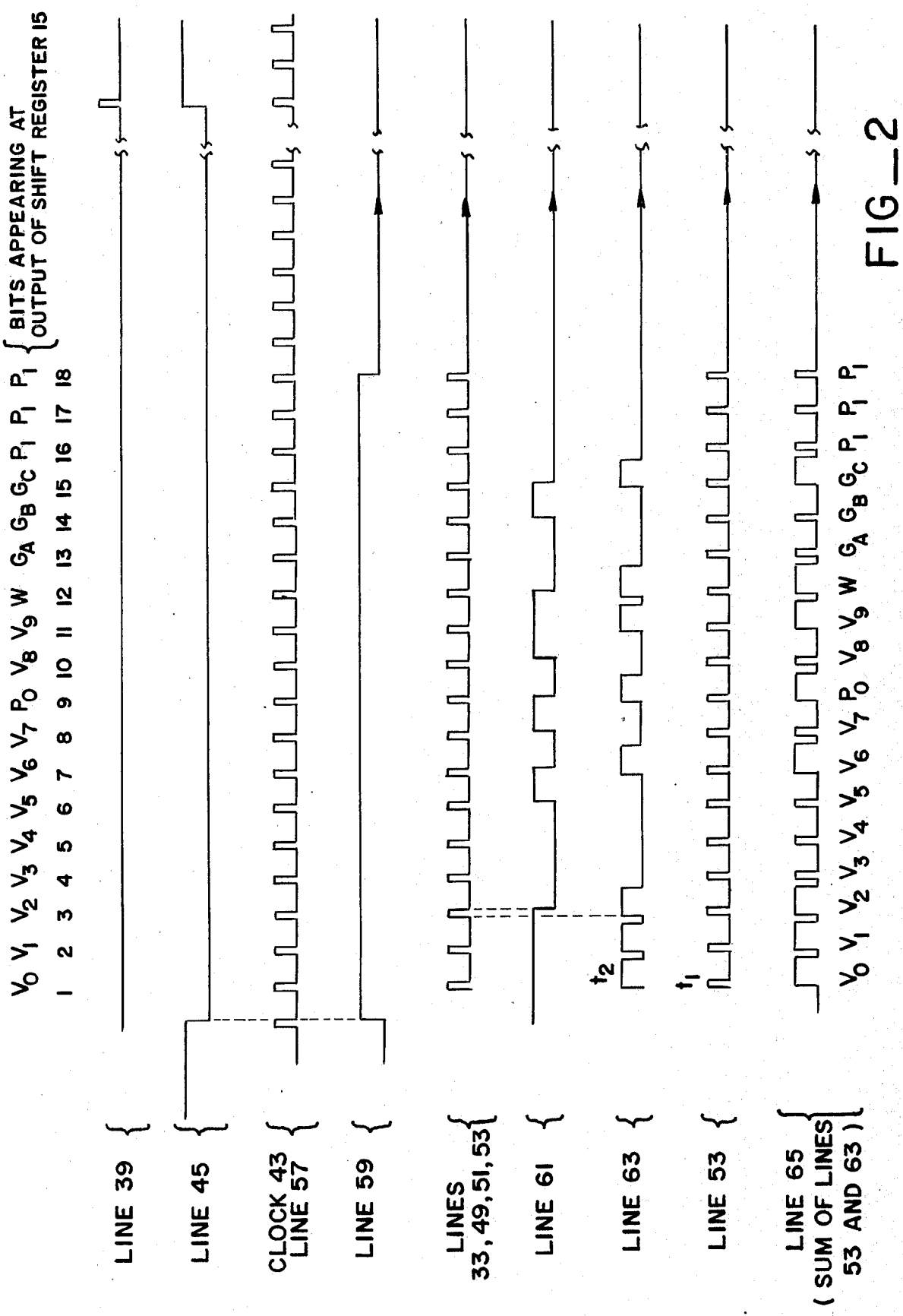
FIG_2

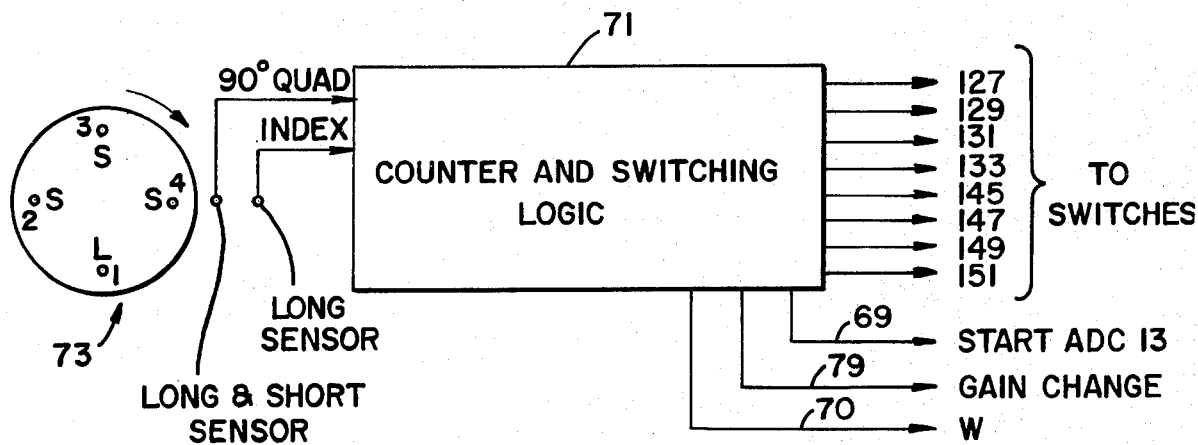
FIG_3
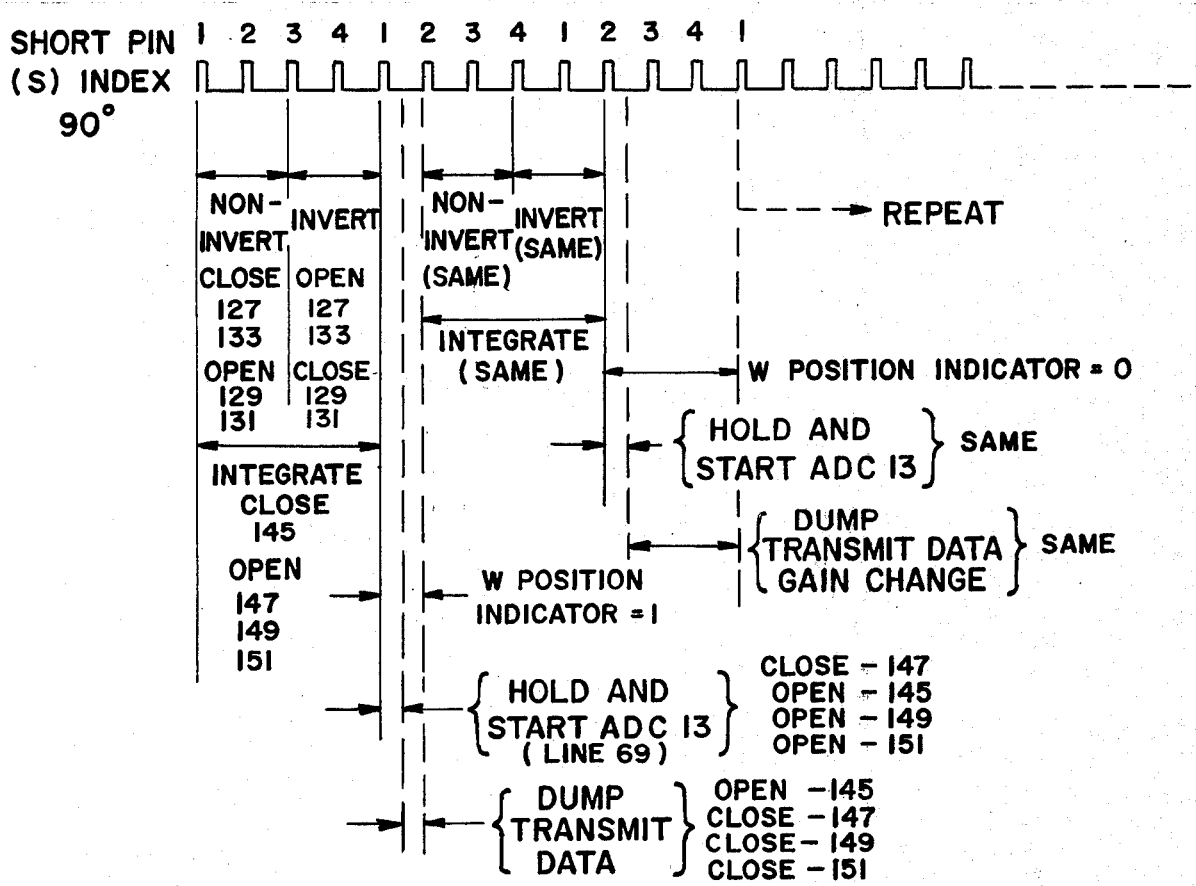
FIG_4

3,996,519

DIGITAL SIGNAL PROCESSOR

BACKGROUND OF THE INVENTION

1. Field of the Invention

The present invention relates to a digital signal processor and more particularly to a digital signal processor that converts analog information into digital information and stores the digital information for subsequent pulse modulation serial data transmission.

2. Description of the Prior Art

One of the difficulties in prior art digital signal processors is that they have been rather complex and of relatively large size. This has been especially disadvantages in situations where the processor must be airborne and be built into a relatively small package. This present invention has overcome these difficulties by providing a digital signal processor that performs both storage and control functions and is reliable, compact and is light in weight.

SUMMARY OF THE INVENTION

Briefly, the present invention comprises a digital signal processor that is particularly suitable for converting an analog input signal into a stored digital signal for serial transmission in short and long time duration signals which will be indicative of the analog input signal. The system employs a digital gain control to maintain nearly uniform transmission signal levels, two parity generators to assure proper signal transmissions, and a set-reset flip-flop shift register and logic system for controlling the output of the serially connected shift register containing the information to be serially transmitted.

In addition, this digital control system of the present invention is particularly suited for being mounted on a rotating shaft and the digital rotating electronics may serve several primary functions, although the circuitry is designed fo economy of size and part count such that the function may be interdependent. The conversion to digital, from an analog signal input, and storage of the digital signal in a shift register for subsequent serial data transmission is one of the chief functions of the system. Another function that the system is capable of performing is the digital sequence control of an analog circuit for acquisition of the analog input signal. Still another function that the system is capable of performing is the conversion of the digital data and other digital information, including parity bits, in serial format to a pulse width modulated light beam such as shown and described in U.S. patent application Ser. No. 486,035 now U.S. Pat. No. 3,917,996 by Peter B. Wagner filed on July 5, 1974. Still another function that the system is capable of performing is the digital control of gain circuitry (See co-pending patent application, Navy Case No. 58,393.) based upon the magnitude of the digital output from the analog to digital convertor. The purpose of the gain control is to automatically keep the analog signal input to the digital convertor is a high accuracy operating region of the convertor.

STATEMENT OF THE OBJECTS OF THE INVENTION

An object of the present invention is to provide a light weight, compact and reliable digital signal processor;

Another object of the present invention is to provide a digital signal processor that will receive an analog signal, convert the analog signal into a digital format and store the digital information for subsequent serial transmission;

Still another object of the present invention is to provide a digital signal processor that will receive an analog signal, convert the analog signal into a digital serial format for conversion into a pulse width modulated signal;

A still further object of the present invention is to provide a digital signal processor that employs parity bits to assure accurate transmission;

A still further object of the present invention is to provide a digital signal processor that employs gain control that may regulate the magnitude of the incoming analog signal.

Other objects, advantages and novel features of the invention will become apparent from the following detailed description of the invention when considered in conjunction with the accompanying drawings wherein:

BRIEF DESCRIPTION OF THE DRAWINGS

FIGS. 1A and 1B together comprise is a schematic diagram of the digital signal processor of the present invention;

FIG. 2 is a diagram illustrating the operation of the digital signal processor of FIGS. 1A and 1B;

FIG. 3 is a schematic diagram of the counter and switching logic of the circuit shown in FIGS. 1A and 1B; and FIG. 4 is a timing diagram illustrating the operation of the counter and switching circuit of FIG. 3 and how it relates to the overall invention.

DESCRIPTION OF THE PREFERRED EMBODIMENT

In FIGS. 1A and 1B is shown a schematic diagram of the digital signal processor 11 of the present invention. It should be noted that the incoming signal is an analog signal $V_{out}$ from analog signal processor 121 that is applied to one of the inputs of analog to digital convertor 13. (Analog signal processor 121 may be of the type shown and described in co-pending patent application, Navy Case No. 58,393.) Normally the analog signal $V_{out}$ will be in the range of ± 10 volts, for example, and therefore to provide sufficient resolution, the digitized binary word reperesenting $V_{out}$ is selected to have 10 bits, for example. Therefore, the least significant bit will represent about 20 milivolts which is sufficient resolution for most purposes.

Analog to digital convertor 13 is of standard design and will therefore not be described in detail. However, the 10 bit output is represented by the symbols $V_0$, $V_1$, $V_2$, $V_3$, $V_4$, $V_5$, $V_6$, $V_7$, $V_8$, and $V_9$ and where $V_0$ is the most significant bit (MSB) and $V_9$ is the least significant bit (LSB). In order to illustrate operation of digital signal processor 11 numerical values have been selected for the bit symbols $V_0$ through $V_9$ as shown in FIG. 1 of the drawings.

The $V_0$ through $V_7$ outputs of analogs to digital convertor 13 are applied in parallel to serial shift register 15 and the parity generator 17. The function of serial shift register 15 is to store and serially transfer, bit by bit, the coded bit information contained therein, as well as the coded bit information transferred thereto from register 23, on command and as hereinafter described in detail.

The function of parity generator 17 is to provide assurance that the information shifted from shift register 15 and ultimately transmitted by transmitter 19 is the correct and accurate information that was digitized by analog to digital converter 13. Parity generator 17 is selected to provide a 1 output signal when the 1 bits sensed thereby are odd and a 0 or no signal when the 1 bits sensed thereby are even. That is, odd 1's = 0 bit and even 1's = 1 bit. Therefore, using the example of FIG. 1 it can be seen that the bits $V_0$, $V_1$, $V_2$ and $V_6$ are 1's and comprise 4 bits and therefore the parity output signal $P_0$ on line 18 is a 1. That is, $P_0 = 1$.

This $P_0 = 1$ bit is stored in the $P_0$ position of serial shift register 23. Serial shift register 23 is an eight bit register and the bit positions from right to left are designated $P_0$, $V_8$, $V_9$, W, $G_A$, $G_B$, $G_C$, and $P_1$ the functions of which will be hereinafter explained.

The input to serial shift register 23 for the positons $P_0$, $V_8$, $V_9$, W, $G_A$, $G_B$, $G_C$, and $P_1$ are respectively 1, 0, 1, 1, 0, 0, 1, 0, for example. The $V_8$ and $V_9$ bits have been previously described as being part of the digitized $V_{out}$ signal where $V_9$ is the least significant bit (LSB). $P_0$ is the parity bit from parity generator 17 and is a 1 for reasons previously explained. W is a control bit which will be hereafter explained and the gain control information $G_A$, $G_B$, and $G_C$ bits are bits which will also be hereinafter explained. Parity bit $P_1$ on line 25 is derived from parity generator 27. From FIG. 1 it can be seen that the inputs to parity generator 27 are $V_8$, $V_9$, W, $G_A$, $G_B$, and $G_C$ and are shown respectively as 1,0, 1, 0, 0, 1. The function of parity generator 27 is similar to that of parity generator 17 in that it provides assurance that the information shifted from serial shift register 23 and ultimately transmitted by transmitter 19 is the correct and accurate information that was digitized and stored in serial shift register 23 which was obtained in part from analog to digital convertor 13 ($V_8$ and $V_9$), in part from counter and switching logic 71 (W) and in part from gain changer 75 ($G_A$, $G_B$ and $G_C$). Parity generator 27 is selected to provide a 1 output when the 1 bits sensed thereby are even and a 0 when the 1 bits sensed thereby are odd. That is, odd 1's = 0 bit and even 1's = 1 bit. Therefore, using the example of FIG. 1 it can be seen that the bits $V_8$, W and $G_C$ are 1's and therefore comprise 3 bits and, therefore, the parity generator output signal $P_1$ on line 25 is a 0. That is, $P_1 = 0$.

In addition, the parity bit generated by parity generator 27 is also applied to the serial input 29 of shift register 23. When shift pulses are applied to shift registers 23 and 15 on line 33, the serial parity bit on line 29 is shifted into shift register 23 and on through shift register 15 as hereinafter explained. The purpose is to make available an 18 bit word from the two 8 bit shift registers, 15 and 23, and place parity bit $P_1$ in position 16 and 17 as well as in positions 15 ($P_1$). Entry of parity in an odd number of positions in the second half of the 18 bit overall word does not alter the resultant parity of that second half of that word. These three P1 parity bits are also shown in FIG. 2 as $P_1$, $P_1$, and $P_1$.

It should be noted that shift registers 15 and 23 are serially connected by line 31 and the digital information will be serially shifted, from left to right, through these two registers, bit by bit, upon command from each sequential signal pulse that appears on line 33 which will be obtained from AND gate 34 as hereinafter explained. It should be noted that the time duration of the pulse from AND gate 34 is $t_1$. The output from line 61 of shift register 15 will be applied to one input of AND gate 35 the output of AND gate 35 which will be applied to the input of one shot multivibrator 37 which is selected to have a signal time duration of $t_2$. It should be noted that $t_2 > t_1$.

Referring to FIGS. 1A, 1B and 2, analog to digital convertor 13 provides an output signal on line 39 when data appears on all of the outputs $V_0$ through $V_9$. When this condition occurs the latch inputs to shift register 15, shift register 23 and the set input to flip-flop 41 are activated. When this occurs then a continuous 1 or up signal will appear at the output of flip-flop 41 on line 45 and therefore a series of 1's will be clocked into 18 bit shift reigster 47 from line 48 which is connected to the output of clock 43. After 18 bits have been shifted into shift register 47 then clock 43 will shift out the first entered bit (which will be a 1) which will be simultaneously applied to the input of AND gate 34 and to the reset (RS) input of flip-flop 41. When the 1 signal is applied to the reset input of flip-flop 41 then the output therefrom will be a 0 which will appear on line 45. This will remain at 0 until a new data complete pulse appears on line 39 from analog to digital convertor 13. Therefore a 0 will remain at the input of shift register 47 until a set signal is received on line 39. After the input to register 47 goes to 0 then 18 one bits will be shifted out and applied to the input of AND gate 34. Since clock pulses are also being applied to AND gate 34 on line 58 then 18 pulses will appear in sequence at the output of AND gate 34 and on lines 33, 49, 51 and 53.

When the series of the 18 pulses are occuring then the shift registers 15 and 23 are shifting and line 51 of AND gate 35 is receiving these sequented pulses and line 53 of OR gate 55 is also receiving these sequented pulses each $t_1$ in length. When a 1 is present on the output 61 of shift register 15, one shot multivibrator 37 is triggered and pulse $t_2$ in length appears on line 63. The $t_2$ pulse on line 63 extends beyond the $t_1$ pulse on line 53. The result is that a pulse $t_2$ to $t_1$ in length appears at the output 65 of OR gate 55 depending on whether shift register 15 output on line 61 is a 1 or a 0, respectively. When the output of AND gate 34 is 0 then no shift signals are applied to the input of shift registers 15 and 23, no signal is applied to line 51 of AND gate 35 and no signal is applied to the line 53 of the input of OR gate 55. In FIG. 2 is illustrated the opertion of the above described digitized signal processor when the previously defined conditions prevail.

The overall system is initiated and generally controlled by counter and switch logic 71 of FIGS. 1A, 1B and 3. In FIG. 3 is also shown a stationary orientation assembly 73 including a long pin L (indexed as 1) and a pluraltiy of short pins (indexed as 2, 3 and 4) and long and short pin sensors which cooperate with the long and short pins. The details of operation of this assembly will not be described herein since they are shown and described in patent application Ser. No. 486,035. The outputs of the long sensor (index) is connected to the input of counter and switching logic 71 and the output of the long and short sensor is connected to another input of counter and switching logic 71, The operation and sequences of switching of the various switches 127, 129, 131, 133, 145, 147, 149 and 151, and the start signal on line 69 for the start of ADC 13 the word (W) on line 70 and the gain charge signal on line 79 are shown in FIG. 3 and in the timing diagram of FIG. 4 along with the positions of the short and long pin signals. It would be obvious to one skilled in the art to design the various switching elements and logic of counter and switching logic 71 to obtain the appropriate signals on the various output lines as defined in FIGS 2, 3 and 4 and the details thereof will not be described.

It should be particularly noted that the circuit of FIGS. 1A and 1B, as explained in conjunction with the timing diagram of FIG. 2 is sufficient to stand by itself as a separate and independent invention to perform the function of converting a given DC signal on line 156 into a digital pulse modulated signal on line 65 that may be then transmitted by transmitter 19. Many different various gain control schemes for $G_A$, $G_B$ and $G_C$ and word index schemes for W could be also employed.

The purpose of showing the specific counter and switching logic schemes of FIGS 3 and 4 is to more completely illustrate how the digital signal processor 11 of the present invention may be used in an electric field measuring device such as shown in patent application, Ser. No. 486,035 and with an analog signal processor such as shown and described in Navy Case No. 58,393.

Gain changer 75 may be responsive to either the analog signal $V_{out}$ or its digital equivalent (such as the first 4 or 5 most significant digits) as shown by line 80. Many different types of gain changer devices 75 could be employed; however, its basic function is to assure that the analog signal processor 12 provides a signal $V_{out}$ that is within an acceptable voltage range. If not then the gain changer must modify the amplification level of the analog signal processor 12 by a signal over line 77 to increase or decrease the gain level. In this particular example three gain levels are shown bits $G_A$, $G_B$ and $G_C$, which represent low, medium and high gains. In the example given a high gain is used ($G_A = G_B = 0$, $G_C = 1$). Therefore, analog signal processor 12 is operating at a high gain and it is important that this information be transmitted over transmitter 19 so that an accurate measure of the $V_{out}$ signal is known. This is done by identifying the $G_A$, $G_B$ or $G_C$ signal that is being used and inserting this information into shift register 23 for subsequent transmission.

What is claimed is:

1. A digital signal processor comprising
   a. an analog to digital convertor for converting analog information into digital information comprising bits of 1's and 0's;
   b. at least one shift register;
   c. at least one parity generator;
   d. said digital information from said analog to digital convertor being transmitted to and stored in said at least one shift register and transmitted to said at least one parity generator;
   e. said at least one parity generator providing output information defining whether the number of 1 bits transmitted thereto was an odd number or an even number;
   f. said output information from said at least one parity generator being applied and stored in said at least one shift register;
   g. first means for serially shifting out the information bits stored in said at least one shift register to second means for converting the 0's from said at least one shift register into pulses of a first time duration $t_1$ and 1's from said at least one shift register into pulses of a second time duration $t_2$;
   h. said analog to digital convertor provides a first output signal when the conversion of the analog information into digital information is complete;
   i. said first output signal being applied to the enable input of said at least one shift register and to the set input of a first flip-flop circuit;
   j. the output of said first flip-flop circuit being applied to the input of a control shift register;
   k. an oscillator having its output connected to another input of said control shift register; and
   l. the output of said control shift register connected to second means for controlling the shift sequence of said at least one shift register.

2. The digital signal processor of claim 1 wherein:
   a. said second means includes a first AND gate and a feedback from said output of said control shift register to the reset input of said flip-flop;
   b. the output of said control shift register connected to one input of said first AND gate and the output of said oscillator connected to the other input of said first AND gate; and
   c. the output of said first AND gate being connected to the shift input of said at least one shift register.

3. The digital signal processor of claim 2 wherein:
   a. the input of said control shift register receives an input signal for a first predetermined number of clock pulses and the output of said control shift register provide no output signal for said first predetermined number of clock pulses and at the end of said predetermined number of clock pulses said output of said control shift register provides an output signal that is applied to the reset input of said flip-flop; whereby
   b. no signals are applied to the input of said control shift register for a second predetermined period of time; whereby
   c. said second predetermined period of time is the same as said first predetermined period of time.

4. The digital signal processor of claim 2 wherein:
   a. the output of said first AND gate being connected to one input of a second AND gate and to the input of a first OR gate;
   b. the output of said at least one shift register being connected to the other input of said second AND gate; and
   c. the output of said first AND gate being connected to the other input of said OR gate.

5. A digital signal processor comprising:
   a. an analog to digital convertor for converting analog information into digital information comprising bits of 1's and 0's;
   b. at least one shift register;
   c. at least one parity generator;
   d. said digital information from said analog to digital convertor being transmitted to and stored in said at least one shift register and transmitted to said at least one parity generator;
   e. said at least one parity generator providing output information defining whether the number of 1 bits transmitted thereto was an odd number or an even number;
   f. said output information from said at least one parity generator being applied and stored in said at least one shift register;
   g. first means for serially shifting out the information bits stored in said at least one shift register to second means for converting the 0's from said at least one shift register into pulses of a first time duration $t_1$ and said 1's from said at least one shift register into pulses of a second time duration $t_2$;
   h. said at least one shift register are first and second shift registers;

i. said at least one partity generator are first and second parity generators;
j. a first predetermined group of bits from said analog to digital processor are applied and stored in respective inputs of said first shift register;
k. said first predetermined group of bits being applied to the input of said first parity generator;
l. the output of said first parity generator being applied to and stored in one input of said first shift register;
m. a second predetermined group of bits from said analog to digital processor are applied to and stored in respective inputs of said second shift register;
n. a gain changer having a predetermined number of output signals indicating gain; and
o. said predetermined number of output signals being applied and stored in respective inputs of said second shift register and applied to the respective inputs of said second parity generator.

6. The digital processor of claim 5 wherein:
a. the output of said parity generator being applied to and stored in one input of said second shift register; and
b. said output of said parity indicator also being applied to the last digit signal reception input of said second shift register.

7. The digital processor of claim 6 including:
a. a counter and switching logic circuit providing a first position signal W;
b. said first position signal W being connected to and stored in another input of said second shift register and applied to another input of said second parity generator; and
c. a second output of said counter and switching logic being connected to the start input of said analog to digital convertor, and a third output of said counter and switching logic circuit being connected to the input of said gain changer.

* * * * *